United States Patent
Reifer

(10) Patent No.: US 7,466,654 B1
(45) Date of Patent: Dec. 16, 2008

(54) METHOD OF DETECTING INTERMEDIARY COMMUNICATION DEVICE

(75) Inventor: Michael H. Reifer, Columbia, MD (US)

(73) Assignee: The United States of America as represented by the Director, National Security Agency, Washington, DC (US)

( * ) Notice: Subject to any disclaimer, the term of this patent is extended or adjusted under 35 U.S.C. 154(b) by 710 days.

(21) Appl. No.: 11/145,237

(22) Filed: May 24, 2005

(51) Int. Cl.
H04L 12/26 (2006.01)

(52) U.S. Cl. .................... 370/235; 370/241.1; 370/248; 370/255; 713/153; 726/12; 726/13; 726/14

(58) Field of Classification Search ................... 726/22, 726/23, 11–15; 370/389, 469, 473, 235, 370/236, 236.1, 236.2, 241.1, 248, 255; 713/153
See application file for complete search history.

(56) References Cited

U.S. PATENT DOCUMENTS

| | | | |
|---|---|---|---|
| 6,363,477 B1* | 3/2002 | Fletcher et al. | 713/151 |
| 6,560,648 B1 | 5/2003 | Dunn et al. | |
| 6,601,098 B1 | 7/2003 | Case et al. | |
| 2002/0093527 A1* | 7/2002 | Sherlock et al. | 345/736 |
| 2003/0053419 A1* | 3/2003 | Kanazawa et al. | 370/252 |
| 2005/0044213 A1* | 2/2005 | Kobayashi et al. | 709/224 |

OTHER PUBLICATIONS

Brownlee et al., RFC 2722—Traffic Flow Measurement: Architecture, Dec. 25, 2002.*
Almes et al., RFC 2679—A One-way Delay Metric for IPPM, Apr. 7, 2003.*
Almes et al., RFC 2680—A One-way Packet Loss Metric for IPPM, Dec. 8, 2002.*
Jin et al., Hop-Count Filtering: An Effective Defense Against Spoofed DDoS Traffic, Oct. 30, 2003, The Association for Computing Machinery.*
Yin Zhang and Vern Paxson, "Detecting Stepping Stones", Proceedings of the $9^{th}$ USENIX Security Symposium, Denver, CO, Aug. 2000.

* cited by examiner

Primary Examiner—Aung S Moe
Assistant Examiner—Hoon J Chung
(74) Attorney, Agent, or Firm—Robert D. Morelli

(57) ABSTRACT

A method of detecting an intermediary communication device in a communication path of a target communication device by inserting a sensor in the path, recording communication packets to and from the target communication device, recording times for the packets, identifying packets in a first interconnection layer, calculating a minimum latency time for the packets, identify packets in a second interconnection layer that is at a different communication processing level than that of the first interconnection layer, calculating a minimum latency time for the packets of the second interconnection layer, and determining that an intermediary communication device is present in the path if an absolute difference between the minimum latency times is above a user-definable threshold.

21 Claims, 2 Drawing Sheets

METHOD OF DETECTING INTERMEDIARY COMMUNICATION DEVICE

FIELD OF INVENTION

The present invention relates, in general, to electrical computers and digital processing systems and, in particular, to computer network monitoring.

BACKGROUND OF THE INVENTION

Computing devices, or computers, evolved from stand alone devices for performing calculations and word processing functions only for the user to widely connected devices for communicating with other computers connected to a network. Early computers had proprietary communication systems, which could only communicate with computers using the same communication system. As computers became more widely used it became necessary to communicate with a wider circle of computers. Such communication made it necessary to standardize the protocol by which computers communicated with each other. The Open System Interconnect (OSI) model was developed to standardize communication of computers over a network, where different equipment and different applications from different vendors could be used. The OSI model divides the computer communication process into seven layers from a lowest abstraction level to a highest abstraction level as follows: (1) a physical layer, (2) a data link layer, (3) a network layer, (4) a transport layer, (5) a session layer, (6) a presentation layer, and (7) an application layer.

The seven layers divide the task of moving information from one computer to another over a network into seven smaller, more manageable tasks. Each task associated with computer communication is assigned to one of the seven OSI layers. Each task performed by a layer is self-contained so that it can be implemented independent of any other layer. This allows the different layers to be updated without adversely affecting the operation of any other layer.

The physical layer defines the physical means of sending data over the network. The physical layer defines how data is to be transmitted in machine-readable format.

The data link layer defines procedures for operating communication links, framing data packets, and detecting and correcting transmission errors in packets.

The network layer defines how data are to be transferred between network devices, how packets are to be routed, and how to control flow and prevent congestion of the network.

The transport layer defines how the end-to-end delivery of data in a network is to be managed.

The session layer defines how sessions and dialogues between network devices are to be managed and how establishment and termination of logic links between users are to be controlled.

The presentation layer defines how to mask differences between data formats of dissimilar systems, defines an architecture-independent data transfer format, and defines how to encode and decode data (e. g., encrypt/decrypt, compress/decompress).

The application layer defines an interface to user processes for communication and data transfer in the network, and provides standardized services such as virtual terminal, file, and job transfer and operations.

The OSI architecture includes seven layers: physical layer, a data link layer, a network layer, a transport layer, a session layer, a presentation layer, and an application layer. The layers work together to effect communication from one computer to another, but at different levels of abstraction from the highest level (i.e., the application layer in which human-readable communication such as electronic mail, or email, is transmitted) to the lowest level (i.e., the physical layer in which a machine-readable version of the human-readable communication is transmitted to an intended computer). The layers between the highest layer and the lowest layer (i. e., the presentation layer, the session layer, the transport layer, the network layer, and the data link layer) each convert the output of the next higher layer to effect the eventual conversion of the human-readable communication to machine-readable and machine-transportable format. The intended computer reverses the application of these layers to convert the machine-readable communication to the human-readable communication.

The transport layer, the session layer, the presentation layer, and the application layer deal with communication between the source computer and the destination computer. The physical layer, the data link layer, and the network layer deal with communications between network devices.

A topic of concern to many computer users is the time that it takes for computer communication to occur. A unit of measure of computer communication performance is latency. A message is typically transmitted in packet form over a computer network (i.e., a message is distributed amongst a number of packets, each packet is transmitted over the computer network, and the receiver reconstructs the message by putting the packets back together). Latency of a transmitted packet is defined as the amount of time from the time that a packet is sent by a source computer to a destination computer and the time that a reply message, commonly referred to as an acknowledgement message, is received by the source computer indicating that the packet was received by the destination computer.

Another topic of concern is determining if a message received was sent via an intermediary, or "stepping stone," computer. Hackers often disguise their identity by using intermediary computers that they have compromised. Tracing a message through intermediary computers to determine its true origin can be difficult. Therefore, there is a need for a method of determining if an intermediary computer was used to send a message.

In an article entitled "Holding Intruders Accountable on the Internet," Stuart Staniford-Chen and L. Todd Herberlein disclose a method of tracing intruders into a computer system by computing summaries (i.e., checksums) of the message content of each connection to a computer, comparing the summaries, and determining that two connections concern the same intruder if the summaries are sufficiently similar. The present method does not rely on the connection contents of a message as does this article.

In an article entitled "Detecting Stepping Stones," Yin Zhang and Vern Paxson disclose a method of detecting intermediary computers without using message content. The authors say that methods of detecting intermediary computers using message content are easily avoided by encrypting the message content. Instead, the authors propose a method of detecting intermediary computers by recording the ON and OFF periods of communications between computers, where an ON period is defined as the time between when a non-empty packet is sent and when communication is considered in an OFF period, and where an OFF period is defined as when there is no data traffic on a flow for more than a user-definable period of time. The present method does not rely on ON and OFF periods.

In an article entitled "Finding a Connection Chain for Tracing Intruders," Kunikazu Yoda and Hiroaki Etoh disclose a method of finding a connection chain of intermediary computers that an intruder may have used to hide his identity before breaking into his target computer. The authors disclose a method of tracing intruders that requires recording timestamps of packets at many places on the Internet. The present method does not require the recording of timestamps at many places on the Internet.

U.S. Pat. No. 6,560,648, entitled "METHOD AND APPARATUS FOR NETWORK LATENCY PERFORMANCE MEASUREMENT," discloses a device for and method of measuring latency of a computer network by using a known method of measuring latency, called a PING, and using a new method of measuring latency, called an Extended PING. The present invention does not require the use of an Extended PING as does U.S. Pat. No. 6,560,648. U.S. Pat. No. 6,560,648 is hereby incorporated by reference into the specification of the present invention.

U.S. Pat. No. 6,601,098, entitled "TECHNIQUE FOR MEASURING ROUNDTRIP LATENCY TO COMPUTING DEVICES REQUIRING NO CLIENTSIDE PROXY PRESENCE," discloses a device for and method of measuring latency by recording a first timestamp after a first request for a first Uniform Resource Locator (URL) is received, sending a code for moving a page temporarily for the URL, recording a second timestamp after receiving a second request concerning the URL, and using the difference of the two timestamps as the latency. The present invention does not send a code for moving a page temporarily for a URL as does U.S. Pat. No. 6,601,098. U.S. Pat. No. 6,601,098 is hereby incorporated by reference into the specification of the present invention.

SUMMARY OF THE INVENTION

It is an object of the present invention to detect the presence of an intermediary communication device in the communication path of another communication device.

It is another object of the present invention to detect the presence of an intermediary communication device in the communication path of another communication device using latency times determined at only one point in the path.

It is another object of the present invention to detect the presence of an intermediary communication device in the communication path of another communication device using latency times determined at only one point in the path and at different interconnection layers.

The present invention is a method of detecting the presence of an intermediary communication device in a communication path of another communication device (i.e., target communication device).

The first step of the method is inserting a sensor in the communication path.

The second step of the method is recording the communication packets to and from the target communication device.

The third step of the method is recording a time for each communication packet.

The fourth step is identifying the communication packets that are in a first user-definable interconnection layer.

The fifth step of the method is calculating a minimum latency time for the communication packets identified in the fourth step using the times recorded for the packets.

The sixth step of the method is identifying communication packets that are in a second user-definable interconnection layer, where the second interconnection layer is at a different communication processing level than that of the first user-definable interconnection layer.

The seventh step of the method is calculating a minimum latency time for the communication packets identified in the sixth step using the times recorded for the packets.

The eighth, and final, step of the method is determining that an intermediary communication device is in the communication path of the target communication device if an absolute difference between the results of the fifth step and the seventh step is above a user-definable threshold.

DETAILED DESCRIPTION

The present invention is a method of detecting the presence of an intermediary communication device in the communication path of a target communication device. The communication device is preferably a computer, but the present invention applies to any other suitable communication device that communicates using different interconnection layers. The communication path is preferably the communication network on which a target communication device operates (e.g., a computer network if the communication device is a computer), but any other suitable communication path is possible.

Figure 1:
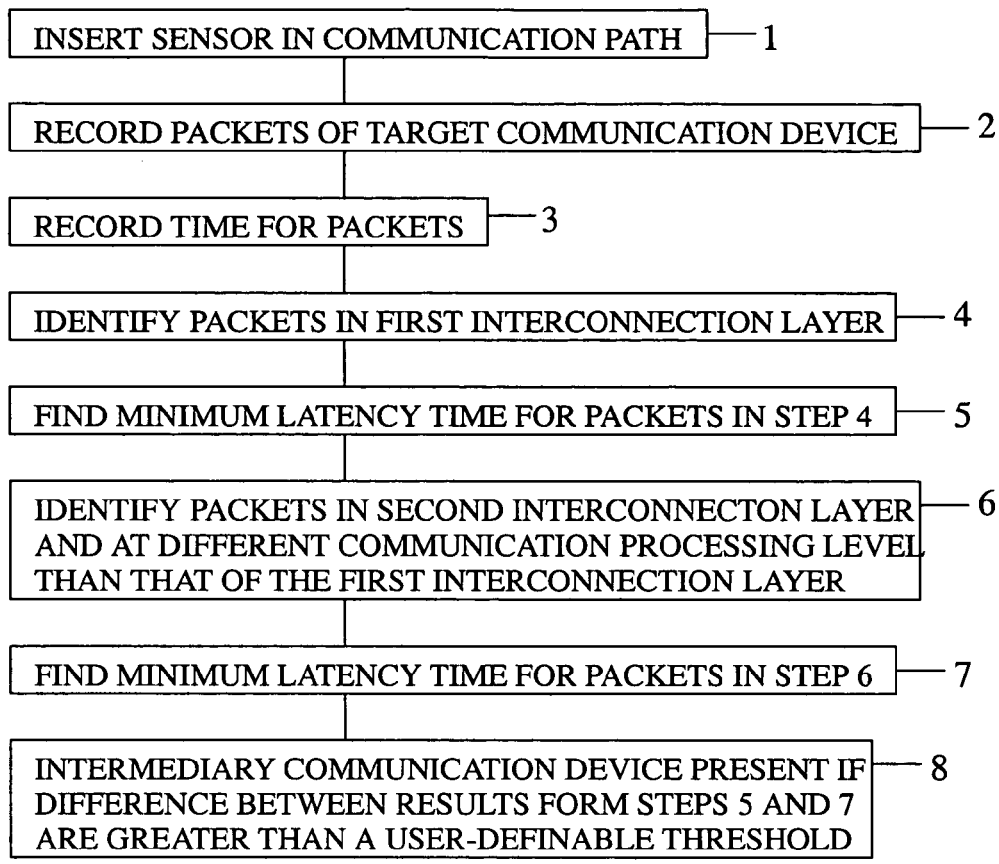
FIG. 1 is a flowchart of the preferred method of the present invention.

FIG. 1 is a flowchart of the preferred method of the present invention.

The first step 1 of the method is inserting a sensor in the communication path of the target communication device. The sensor may be placed near the target communication device, the server that services the target communication device, or in any other suitable location within the communication path. The sensor may be passive or active. A passive sensor merely reads packets in the network to which it is connected. An active sensor can both read packets in the network on which it is connected and create, transmit, and receive packets from the network on which it is connected.

The second step 2 of the method is recording a number of communication packets to and from the target communication device using the sensor. A record of such communication packets is commonly referred to as a flow. In the preferred embodiment, Internet Protocol (IP) packets are recorded. However, the present invention may record any other type of communication packets sent to and from a communication device.

The third step 3 of the method is recording a time for each communication packet recorded in the second step 2. The time recorded may be either absolute time (i.e., clock time), relative time (i.e., stop-watch time), or any other suitable time-keeping method. For example, a first computer packet seen at the sensor may be given time zero. The next computer packet seen at the sensor may be given the elapsed time from the time that the first computer a packet was seen, and so forth for the other computer packets. Typically, each computer packet sent from a computer elicits a response from the receiving computer. The response is commonly referred to as an acknowledgement message. The acknowledgement message indicates whether or not the sent packet was properly received. The present method records both transmitted packets and acknowledgement packets and assigns a time to each.

The fourth step 4 of the method is identifying communication packets recorded in the second step 23 that are in a first user-definable interconnection layer. The electronic devices that make up a computer operate user binary bits (i.e., electrical signals that represent logical ones and zeros). However, people communicate at a different, or higher, level that that (i.e., spoken language, written language, pictures, etc.). Therefore, computer architectures were devised to allow for the conversion of information from one level or interconnection layer to another so that each participant or device in a communication received information at their preferred interconnection layer (i.e., written language for humans, binary bits for electronic devices). One such interconnection protocol is the Open Systems Interconnection (OSI) protocol. The OSI protocol consists of seven layers, where each layer processes information of a different kind. The seven layers, from lowest to highest, are a physical layer, a data link layer, a network layer, a transport layer, a session layer, a presentation layer, and an application layer. Examples of these layers include Machine Authentication Codes addresses or MAC addresses (i.e., a data link layer), IP addresses (i.e., a network layer), secure shells (i.e., a transport layer), and telephone networks or Telnets (i.e., an application layer). Humans prefer communicating at the application layer, whereas electronic devices process information most efficiently at lower layers. In the preferred embodiments, OSI layers are used as the interconnection layers. However, any other suitable interconnection protocol may be used in the present invention.

The fifth step 5 of the method is calculating a minimum latency time for the communication packets identified in the fourth step 4 using the times recorded in the third step 3 for the communication packets. A latency period is the difference between the time that the sensor records a communication packet being sent to or from the target communication device and the time that an acknowledgement message that corresponds with the communication packet is recorded by the sensor. The time may be recorded in absolute time (i.e., clock time), relative time (i.e., stop-watch time), or any other suitable time-recordation method.

The sixth step 6 of the method is identifying communication packets recorded in the second step 2 that are in a second user-definable interconnection layer, where the second interconnection layer is at a different communication processing level than that of the first user-definable interconnection layer. In the preferred embodiment, the OSI layer of the communication packets recorded in the sixth step 6 are at a different OSI layer than that of the communication packets recorded in the second step 2. The interconnection layer in the sixth step 6 may be either higher or lower than that of the second step 2.

The seventh step 7 of the method is calculating a minimum latency time for the communication packets identified in the sixth step 6 using the times recorded in the third step 3 for the communication packets. The latency time in the seventh step 7 is preferably determined in the same manner as in the fifth step 5. However, any possible latency determination method may be used in the fifth step 5 and the seventh step 7. In addition, the methods employed in the fifth step 5 and the seventh step 7 may be different.

The eighth, and final, step 8 of the method is determining that an intermediary communication device is in the communication path of the target communication device if an absolute difference between the results of the fifth step 5 and the seventh step 7 is above a user-definable threshold. Depending on what interconnection layer is chosen for the second interconnection layer (i.e., higher or lower than that of the first interconnection layer), the latency in the seventh step 7 may be either higher or lower than that of the fifth step 5. The eighth step 8 is only interested in the absolute different between these latencies, and not the sign of the result. For example, 5–10 and 10–5 each represent a difference of 5 for the purposes of the eighth step 8. If the difference is larger than a user-definable threshold then it will be determined that an intermediary communication device is in the communication path of the target communication device. In the preferred embodiment, the user-definable threshold is determined empirically. This is necessary because of the vast differences in transmission speeds of various communications paths (e.g., dial-up modem, cable networks, etc.).

Figure 2:
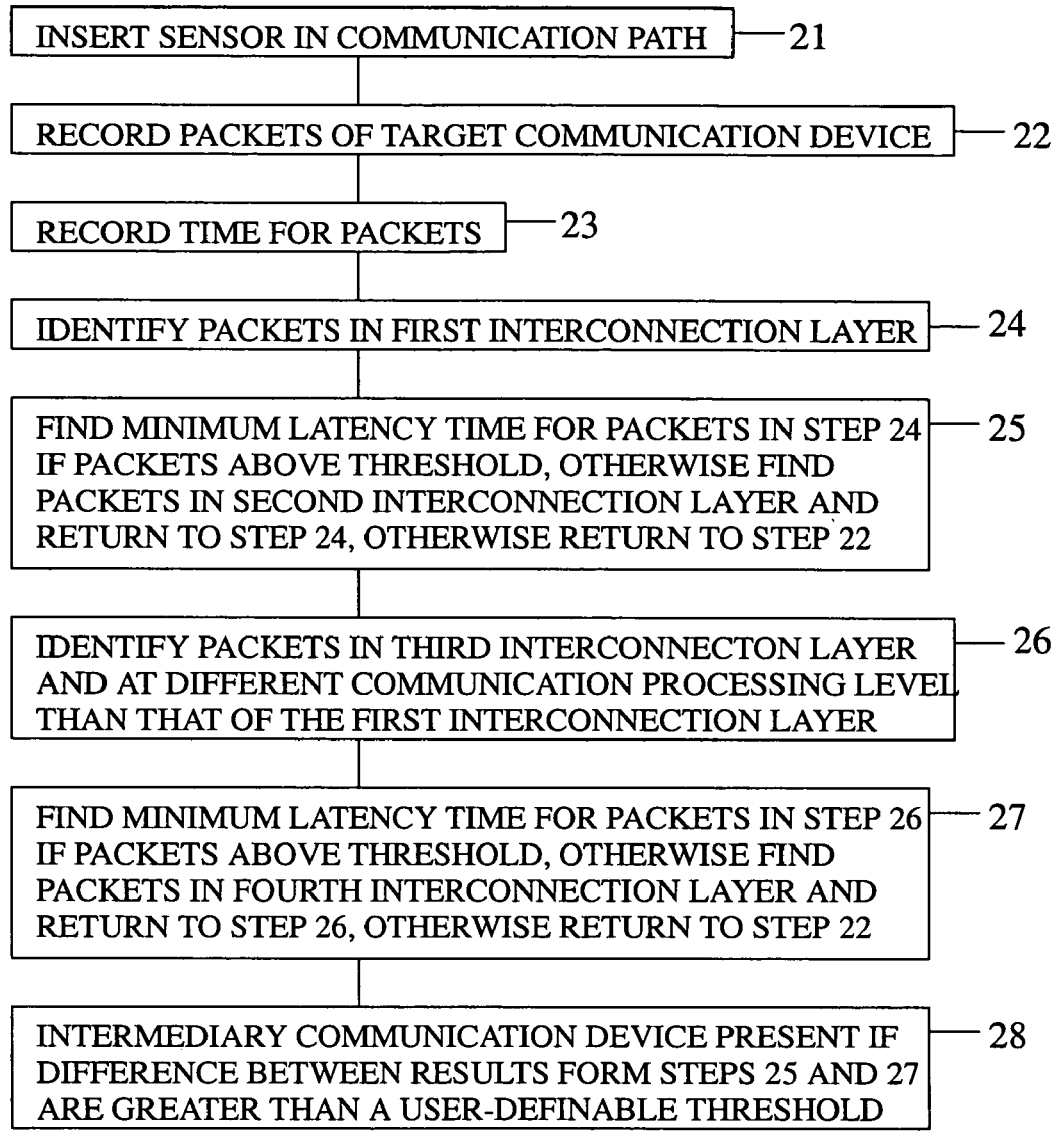
FIG. 2 is a flowchart of the steps of an alternate embodiment of the present invention.

FIG. 2 is an alternative embodiment of detecting the presence of an intermediary communication device in the communication path of a target communication device. In the alternate embodiment, the communication device is a computer. However, the alternate method applies to any communication device that uses multiple interconnection layers.

The first step 21 of the alternate method is inserting a sensor in the communication path of the target communication device.

The second step 22 of the alternate method is recording a number of communication packets to and from the target communication device. In the preferred embodiment, the communication packets are IP packets for a computer, but any other suitable communication packet may be used in the alternate method.

The third step 23 of the alternate method is recording a time for each communication packet recorded in the second step 22. The time may be recorded in absolute time (i.e., clock time), relative time (i.e., stop-watch time), or in any other suitable time-keeping method.

The fourth step 24 of the alternate method is identifying communication packets recorded in the second step 22 that are in a first user-definable interconnection layer. The possible interconnect layers used in the alternate method of FIG. 2 are the same as those describe above in the preferred embodiment of FIG. 1.

The fifth step 25 of the alternate method of FIG. 2 is calculating a minimum latency time for the communication packets identified in the fourth step 24 using the times recorded in the third step 23 for the packets if the number of packets is above a user-definable threshold. Otherwise, changing the first user-definable interconnection layer to a second user-definable interconnection layer and returning to the fourth step 24 if the communication packets recorded in the second step 22 include packets of the second user-definable interconnection layer. This option in the fifth step 25 is for looking for other types of communication packets (e.g., MAC addresses, IP addresses, secure shells, and Telnets) in sufficient numbers for performing a minimum latency calculation before abandoning the recorded flow and recording another flow. If neither of these conditions is met then returning to the second step 22 to record another flow of communication packets. The user-definable threshold is empirically determined to ba a number that guarantees that a minimum latency time can be calculated.

The sixth step 26 of the alternate method is identifying communication packets recorded in the second step 22 that are in a third user-definable interconnection layer, where the third user-definable interconnection layer is at a different communication processing level than that of the first user-definable interconnection layer. The communication processing level of the third interconnection layer may be higher or lower than that of the first interconnection layer.

The seventh step 27 of the alternate method is calculating a minimum latency time for the communication packets identified in the sixth step 26 using the times recorded in the third step 23 for the communication packets if the number of communication packets identified in the sixth step 26 is above a user-definable threshold. Otherwise, changing the type of the third user-definable interconnect layer to that of the fourth user-definable interconnect layer and returning to the sixth step 26 if the communication packets recorded in the second step 22 include communication packets of a fourth user-definable interconnect layer, where the fourth user-definable interconnect layer is at a different communication processing level than that of the first user-definable interconnect layer. The option for the seventh step 27 is for exhausting all of the different communication packet types in the different interconnection layers before abandoning the recorded flow and recording another flow. If neither of these conditions are met then returning to the second step 22 to record another flow of communication packets. The threshold is empirically determined to guarantee that a minimum latency time can be calculated.

The eighth, and final, step 28 of the alternate method is determining that an intermediary communication device is in the communication path of the target communication device if an absolute difference between the results of the fifth step 25 and the seventh step 27 is above a user-definable threshold. The difference in the eighth step 28 of the alternate method is as defined above in the eighth step 8 of the preferred embodiment of FIG. 1.

What is claimed is:

1. A method of detecting an intermediary communication device in a communication path of a target communication device, comprising the steps of:
   a) inserting a sensor in the communication path of the target communication device;
   b) recording at the sensor a user-definable number of communication packets to and from the target communication device;
   c) recording a time at the sensor for each communication packet recorded in step (b);
   d) identifying communication packets recorded in step (b) that are in a first user-definable interconnection layer;
   e) calculating a minimum latency time for the communication packets identified in step (d) using the times recorded in step (c) for the communication packets;
   f) identifying communication packets recorded in step (b) that are in a second user-definable interconnection layer, where the second interconnection layer is at a different communication processing level than that of the first user-definable interconnection layer;
   g) calculating a minimum latency time for the communication packets identified in step (f) using the times recorded in step (c) for the communication packets; and
   h) if an absolute difference between the results of step (e) and step (g) is above a user-definable threshold then determining that an intermediary communication device is in the communication path of the target communication device.

2. The method of claim 1, wherein the step of recording at the sensor a user-definable number of communication packets to and from the target communication device is comprised of the step of recording at the sensor a user-definable number of Internet Protocol packets to and from a target computer.

3. The method of claim 1, wherein the step of recording a time at the sensor for each communication packet recorded in step (b) is comprised of the step of recording a time at the sensor for each Internet Protocol packet recorded in step (b).

4. The method of claim 1, wherein the step of identifying communication packets recorded in step (b) that are in a first user-definable interconnection layer is comprised of the step of identifying Internet Protocol packets recorded in step (b) that are in a first user-definable Open Systems Interconnection layer.

5. The method of claim 1, wherein the step of calculating a minimum latency time for the communication packets identified in step (d) using the times recorded in step (c) for the communication packets is comprised of the step of calculating a minimum latency time for the Internet Protocol packets identified in step (d) using the times recorded in step (c) for the Internet Protocol packets.

6. The method of claim 1, wherein the step of identifying communication packets recorded in step (b) that are in a second user-definable interconnection layer, where the second user-definable interconnection layer is at a different communication processing level than that of the first user-definable interconnection layer is comprised of the step of identifying Internet Protocol packets recorded in step (b) that are in a second user-definable Open Systems Interconnection layer, where the second user-definable Open Systems Interconnection layer is at a different computer processing level than that of the first user-definable Open Systems Interconnection layer.

7. The method of claim 1, wherein the step of calculating a minimum latency time for the communication packets identified in step (f) using the times recorded in step (c) for the communication packets is comprised of the step of calculating a minimum latency time for the Internet Protocol packets identified in step (f) using the times recorded in step (c) for the Internet Protocol packets.

8. The method of claim 1, wherein the first and second user-definable interconnection layers are each selected from the group of Open Systems Interconnection layers consisting of, from lowest computer processing level to highest computer processing level, a physical layer, a data link layer, a network layer, a transport layer, a session layer, a presentation layer, and an application layer.

9. The method of claim 1, wherein the steps of calculating minimum latency times are each comprised of the step of calculating minimum latency time selected from the group of minimum latency-time calculation methods consisting of absolute time, relative time, and any other suitable timekeeping method.

10. The method of claim 1, where in the step of identifying communication packets recorded in step (b) that are in a second user-definable interconnection layer, where the second interconnection layer is at a different communication processing level than that of the first user-definable interconnection layer is comprised of the step of identifying computer packets recorded in step (b) that are in a second user-definable interconnection layer, where the second interconnection layer is selected from the group of interconnection layers that is lower than that of the first user-definable interconnection layer or higher than that of the first user-definable interconnection layer.

11. The method of claim 1, wherein the step of inserting a sensor in the communication path of the target communication device is comprised of the step of inserting a sensor in the communication path of the target communication device selected from the list of sensors consisting of a passive sensor and an active sensor.

12. A method of detecting an intermediary communication device in a communication path of a target communication device, comprising the steps of:
   a) inserting a sensor in the communication path of the target communication device;
   b) recording at the sensor a user-definable number of communication packets to and from the target communication device;
   c) recording a time at the sensor for each communication packet recorded in step (b);

d) identifying a communication packets recorded in step (b) that are in a first user-definable interconnection layer;

e) if the number of communication packets identified in step (d) is above a user-definable threshold then calculating a minimum latency time for the communication packets identified in step (d) using the times recorded in step (c) for the communication packets, otherwise if the communication packets recorded in step (b) include communication packets of a second user-definable interconnection layer then changing the first user-definable interconnection layer to the second user-definable interconnection layer and returning to step (d), otherwise returning to step (b);

f) identifying communication packets recorded in step (b) that are in a third user-definable interconnection layer, where the third user-definable interconnection layer is at a different communication processing level than that of the first user-definable interconnection layer;

g) if the number of communication packets identified in step (f) is above a user-definable threshold then calculating a minimum latency time for the communication packets identified in step (f) using the times recorded in step (c) for the communication packets, otherwise if the communication packets recorded in step (b) include communication packets of a fourth user-definable interconnect layer, where the fourth user-definable interconnection layer is at a different communication processing level than that of the first user-definable interconnect layer, then changing the type of the third user-definable interconnect layer to that of the fourth user-definable interconnect layer and returning to step (f), otherwise returning to step (b); and h) if an absolute difference between the results of step (e) and step (g) is above a user-definable threshold then determining that an intermediary communication device is in the communication path of the target communication device.

13. The method of claim 12, wherein the step of recording at the sensor a user-definable number of communication packets to and from the target communication device is comprised of the step of recording at the sensor a user-definable number of Internet Protocol packets to and from a target computer.

14. The method of claim 12, wherein the step of recording a time at the sensor for each communication packet recorded in step (b) is comprised of the step of recording a time at the sensor for each Internet Protocol packet recorded in step (b).

15. The method of claim 12, wherein the steps of identifying communication packets recorded in step (b) that are in a first, second, third, and fourth user-definable interconnection layer are each comprised of the step of identifying Internet Protocol packets recorded in step (b) that are in a user-definable Open Systems Interconnection layer.

16. The method of claim 12, where the step of calculating a minimum latency time for the communication packets identified in step (d) using the times recorded in step (c) for the communication packets is comprised of the step of calculating a minimum latency time for the Internet Protocol packets identified in step (d) using the times recorded in step (c) for the Internet Protocol packets.

17. The method of claim 12, wherein the step of calculating a minimum latency time for the communication packets identified in step (f) using the times recorded in step (c) for the communication packets is comprised of the step of calculating a minimum latency time for the Internet Protocol packets identified in step (f) using the times recorded in step (c) for the Internet Protocol packets.

18. The method of claim 12, wherein the first, second, third, and fourth interconnection layers are each selected from the group of Open Systems Interconnection layers consisting of, from lowest computer processing level to highest computer processing level, a physical layer, a data link layer, a network layer, a transport layer, a session layer, a presentation layer, and an application layer.

19. The method of claim 12, wherein the steps of calculating minimum latency times are each comprised of the step of calculating minimum latency time selected from the group of minimum latency-time calculation methods consisting of absolute time, relative time, and any other suitable timekeeping method.

20. The method of claim 12, where in the steps of identifying communication packets that are in a second, third, and fourth user-definable interconnection layer, where the second, third, and fourth interconnection layers are each at a different communication processing level than that of the first user-definable interconnection layer, are each comprised of the step of identifying communication packets selected from the group of interconnection layers that is lower than that of the first user-definable interconnection layer or higher than that of the first user-definable interconnection layer.

21. The method of claim 12, wherein the step of inserting a sensor in the communication path of the target communication device is comprised of the step of inserting a sensor in the communication path of the target communication device selected from the list of sensors consisting of a passive sensor and an active sensor.

* * * * *